March 21, 1939.  R. H. BERGSTRÖM  2,150,959
TOOL HOLDER
Filed Dec. 18, 1937  2 Sheets-Sheet 1

INVENTOR
ROAR HENRY BERGSTRÖM
BY: Haseltine, Lake & Co.
ATTORNEYS.

March 21, 1939.   R. H. BERGSTRÖM   2,150,959
TOOL HOLDER
Filed Dec. 18, 1937   2 Sheets-Sheet 2
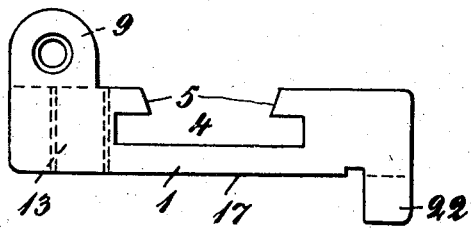
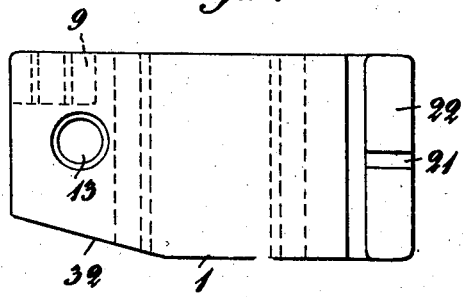
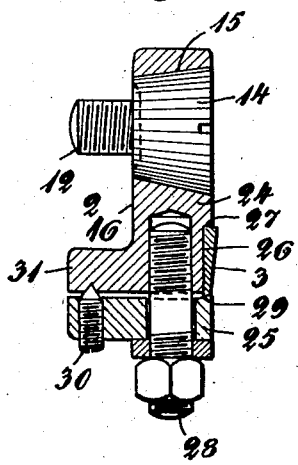
INVENTOR
ROAR HENRY BERGSTRÖM
By: Haseltine, Lake & Co.
ATTORNEYS Patented Mar. 21, 1939

2,150,959

UNITED STATES PATENT OFFICE 2,150,959

TOOL HOLDER

Roar Henry Bergström, Halmstad, Sweden

Application December 18, 1937, Serial No. 180,494
In Sweden December 22, 1936

4 Claims. (Cl. 29—96)

The present invention refers to a tool holder, preferably for lathe tools, and the object of the invention is to provide a tool holder permitting automatic withdrawal of the tool if during the working operation it is subjected to a sudden excessive strain that would otherwise cause breakage of the tool.

This is obtained according to the invention by the feature that the tool holder is composed of a member adapted to be clamped onto a holder block, for example, and to be adjusted vertically, and of a member carrying the tool, which latter member is rotatably mounted in a vertical direction in the first-mentioned member and connected therewith by means of a spring, which is so arranged that the rotatable member is automatically turned against the influence of the spring so as to retract the tool if the latter is suddenly subjected to a strain exceeding the tension of the spring.

Other features characteristic of the invention will be described more fully in the following with reference to the form of embodiment illustrated in the accompanying drawings.

Figs. 3 and 4 show, in plan view and in elevation respectively, that portion of the tool holder which is intended to be clamped onto a holder block.

Fig. 5 shows a cross-section on line V—V in Fig. 1 through the rotatable portion of the tool holder.

In the drawings like references designate the same or similar parts.

Figure 1:
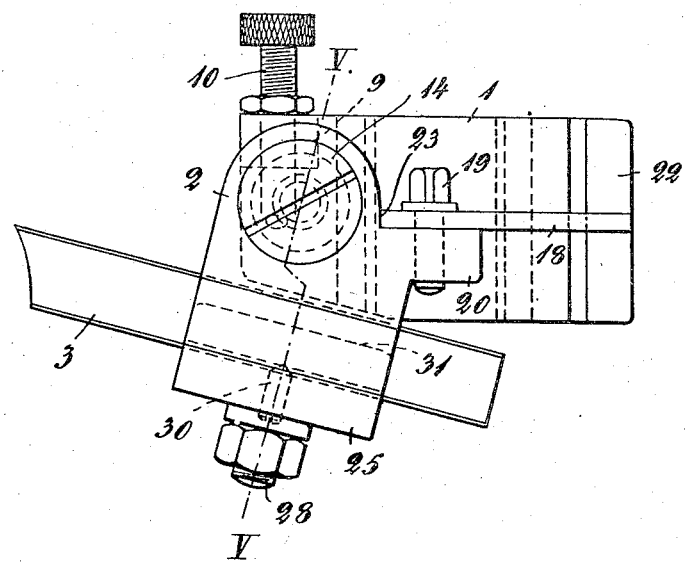
Fig. 1 is an elevation of a tool holder according to the invention with a lathe tool clamped tightly therein.

The tool holder comprises a member 1 adapted to be clamped and to be adjusted vertically, as well as a vertically rotatable member 2 connected to the member 1, the tool 3 being adapted to be clamped tightly to the member 2. The member 1 adapted to be clamped is in known manner provided with a vertical prismatic recess 4 and with vertical oblique clamping surfaces 5. The recess 4 is adapted to co-operate with a flange or head 6 on a clamping member displaceably arranged in the holder block 7, said flange being adapted to be introduced with some play into the recess 4 and to guide the tool holder at the vertical positioning of the latter prior to its being clamped onto the holder block which is provided with vertical oblique clamping surfaces corresponding to the clamping surfaces 5, so that when the clamping member is displaced toward the holder block by means of a special device, the flange 6 is caused to entrain the tool holder so as to press the clamping surfaces 5 and 8 against each other.

Figure 2:
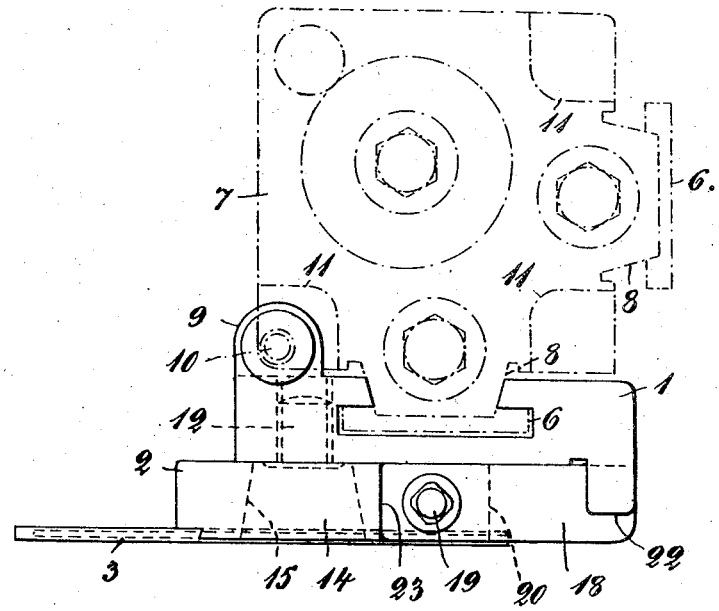
Fig. 2 shows the tool holder viewed from above and clamped onto a holder block indicated by chain-dotted lines, said holder block being intended to be secured on the support of a lathe.

For the purpose of adjusting the tool holder vertically prior to its being clamped, the member 1 adapted to be clamped is provided in the example shown with a projection or lug 9 at the one end thereof, a vertical set screw 10 being threaded into the said lug. The lower end of this set screw is intended to be set against some portion of the holder block. As indicated in Fig. 2, the holder block 7 may be provided, for instance, with recesses 11 arranged in one or more of the upper corners, the set screw 10 being adapted to be set against the bottom of said recesses. If desired, the member 1 may be provided at each end with a similar lug 9 and a set screw threaded into the same. As indicated in Fig. 2, the holder block may have two adjacent sides arranged for alternative securing of a tool holder.

The member 2, which carries the tool 3, is secured to the member 1 by means of a screw 12 which is screwed into a corresponding threaded bore 13 in the member 1. The screw 12 is provided with a conical head 14 fitted into a corresponding conical bore 15 in the member 2, in a manner such that the latter upon the tightening of the screw 12 is caused to bear with its plane side 16 facing the member 1 against the plane side 17 of the member 1 to be guided thereby, while permitting at the same time to be turned vertically about the head 14.

This turning movement is counteracted by a spring 18 connecting the two members 1 and 2. The spring 18, which is preferably a leaf spring, may be rigidly connected with one of the two members while being loosely connected to the other member. In the example shown, the spring 18 is rigidly connected at the one end thereof with the rotatable member 2 by means of a screw 19 which is screwed into a lateral projection or flange 20 of the member 2. The other end of the spring is thrust into a slot 21 provided in a lateral projection 22 of the member 1. The spring is preferably arranged in a manner such as to be caused to bear with its one end edge 23 against a corresponding transverse surface of the member 2, whereby the spring is prevented from turning from its position in a transverse direction.

The rotatable member 2 consists of two parts 24 and 25 between which the tool 3 is clamped tightly. In the example shown, the tool is constituted by a lathe tool. Provided at the bottom in the outer side of the part 24 is a recess 26, so that a longitudinal obliquely outwardly directed setting edge 27 is formed for the tool. The part 25 consists of a plate which is attached to the part 24 by means of a screw 28. Opposite the recess 26, the plate 25 is provided with a longitudinal, obliquely outwardly directed setting edge 29 for the tool which at the tightening of the screw 28, as shown in Fig. 5, is clamped tightly between the edges 27 and 29 with its correspondingly shaped edges, so that the tool is securely retained. To adjust the clamping of the tool, there is provided a set screw threaded into the plate 25, said screw bearing on the part 24, for instance against a lateral projection or a flange 31 thereof. By adjusting the screw 30 the inclination of the plate 25 and thus of the edge 29 may be altered, so that an effective clamping of the tool can always be obtained.

Since the longitudinal upper edges of the lathe tool will be obliquely directed relatively to the horizontal plane, the edges 27 and 29 as well as the plate 25 and the flange 31 will also be obliquely directed with respect to the horizontal plane. To facilitate the placing of different rotatable members 2 on the member 1 for lathe tools of different angles of inclination, the member 1 is bevelled off on its lower side, as at 32.

When in the machining operation the lathe tool encounters too great a resistance, catches so to say, the rotatable member 2 is turned against the influence of the spring 18, so that the lathe tool is moved away, whereby it is protected against breakage.

The invention is not limited solely to the form of embodiment disclosed in the drawings.

Thus the part 24 may be conceived as being made in two parts adjustably connected with each other, one of these parts being provided with a recess for the clamping of a lathe tool. By adjusting the two parts into different positions of inclination relatively to each other, lathe tools of different angles of inclination to the horizontal plane may be clamped tightly, without the rotatable member 2 having to be exchanged in its entirety.

Obviously, the invention may be applied also in the case of other tools than lathe tools, and the device for the clamping of the tool to the rotatable member may be of any other suitable construction.

Having now particularly described the nature of my invention and the manner of its operation what I claim is:

1. Tool holder composed of a member adapted to be clamped to a holder block, a horizontal pivot secured to said member, and a tool carrying member rotatably journalled on said pivot against the action of a leaf spring, one end of which is rigidly connected to one of the said two members while its other end is loosely and slidably fitted in a guide provided on the other member, said leaf spring being arranged on the side of said pivot opposite to the cutting point of the tool.

2. Tool holder composed of a member adapted to be clamped to a holder block, a horizontal pivot secured to said member, and a tool carrying member rotatably journalled on said pivot against the action of a leaf spring, one end of which is rigidly connected to the tool carrying member while its other end is loosely and slidably fitted in a slot provided on the member to be clamped to the holder block, said leaf spring being arranged on the side of said pivot opposite to the cutting point of the tool.

3. Tool holder composed of a member adapted to be clamped to a holder block, a horizontal pivot secured to said member, and a tool carrying member rotatably journalled on said pivot against the action of a leaf spring, one end of which is rigidly connected to one of the said two members while its other end is loosely and slidably fitted in a guide provided on the other member, said leaf spring being arranged on the side of said pivot opposite to the cutting point of the tool and adapted in its unstrained state to fix the rotatable tool carrying member in a predetermined angular position on said horizontal pivot in relation to the member to be clamped to the holder block.

4. Tool holder composed of a member adapted to be clamped to a holder block, a horizontal pivot secured to said member, and a tool carrying member rotatably journalled on said pivot against the action of a leaf spring, one end of which is rigidly connected to one of the said two members while its other end is loosely and slidably fitted in a guide provided on the other member, said leaf spring being arranged on the side of said pivot opposite to the cutting point of the tool, and said rotatable member being mounted so that its plane, vertical side bears against a corresponding plane vertical guide face on the member to be clamped to the holder block.

ROAR HENRY BERGSTRÖM.